Dec. 17, 1968     M. GREENBERG ET AL     3,416,243
RESPONDING APPARATUS

Filed April 19, 1965                                       4 Sheets-Sheet 1

INVENTORS
M. GREENBERG
S. ALTER
J. M. BELANICH
ATTORNEY

Dec. 17, 1968 M. GREENBERG ET AL 3,416,243
RESPONDING APPARATUS
Filed April 19, 1965 4 Sheets-Sheet 2
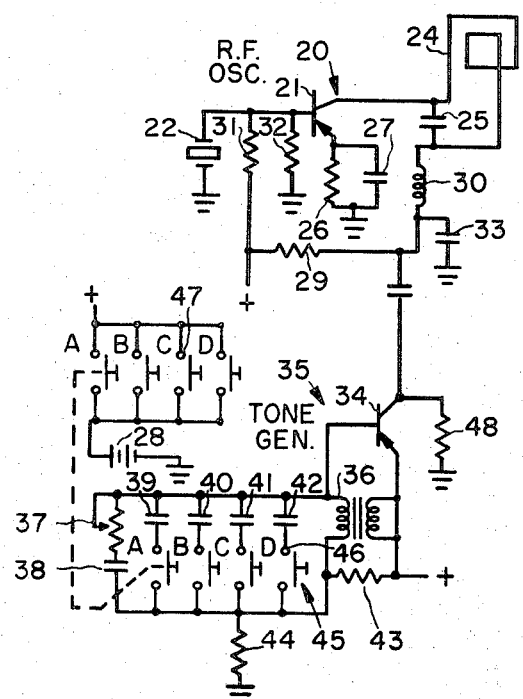
Fig. 3
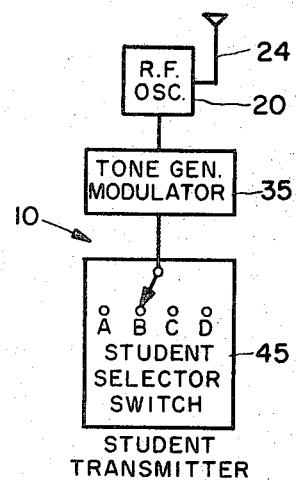
Fig. 2
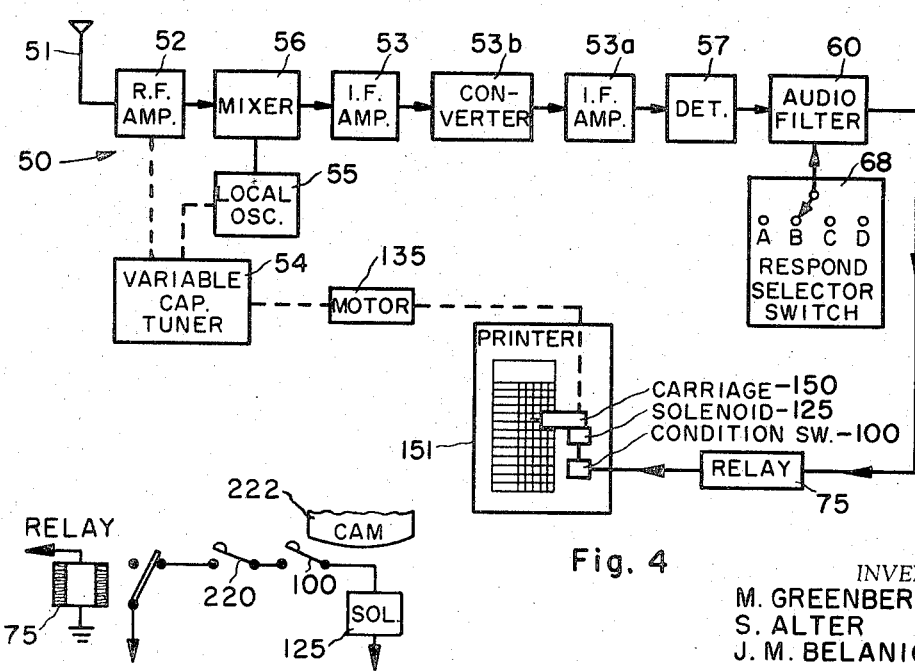
Fig. 4
Fig. 10
INVENTORS
M. GREENBERG
S. ALTER
J. M. BELANICH
ATTORNEY

INVENTORS
M. GREENBERG
S. ALTER
J. M. BELANICH
ATTORNEY

United States Patent Office 3,416,243
Patented Dec. 17, 1968

3,416,243
RESPONDING APPARATUS
Malvin Greenberg, Commack, Soloman Alter, Hartsdale, and John M. Belanich, Port Washington, N.Y., assignors, by mesne assignments, to General Electronic Laboratories, Inc., Boston, Mass., a corporation of Delaware
Filed Apr. 19, 1965, Ser. No. 448,917
5 Claims. (Cl. 35—48)

ABSTRACT OF THE DISCLOSURE

A radio frequency student-to-teacher answering system having a transmitter for each student and a receiver for the teacher, with each transmitter operating at a different carrier frequency and having capacity by the student for modulating the carrier selectively with one of several available tones, the receiver having a chart carrying an identifying space for each of the transmitters, a marking device on a carriage carrying the marking device consecutively over each identifying chart space on the chart, and an arrangement for causing the marking device to selectively mark or not mark the identifying chart space in accordance with the absence or presence of a preselected modulation tone from the corresponding transmitter when the marking device is at the corresponding chart space.

---

This invention relates to audience responding apparatus, and in particular to such apparatus for use as a teaching aid.

Group instructional techniques tend to prove inefficient for one or more of the following reasons:

(1) It is generally a one-way communication system from the lecturer or teacher to the listener or student with the latter playing mainly a passive role.

(2) There is minimum "feedback" to the teacher, that is, the teacher has no knowledge concerning the degree of effectiveness of the presentation unless the students are separately tested or questioned regarding the subject matter of the lecture, which is time consuming unless limited to only a few students.

(3) Even with a testing procedure, minimum "reinforcement" of the student's answer obtains, which means that there may occur a considerable lapse of time between the student's answer and the time when he is advised that the answer is correct. The absence of an immediate indication of the correctness of the student's answer reduces student interest and student motivation.

Leading modern educators strongly recommend the more immediate availability of correct answers to students to reinforce their proper understanding and allow them to modify improper understandings, and also so that the students have an immediate check on their own progress instead of waiting for a test to be given. It is also recommended that the amount of feedback to the teacher be greatly increased enabling the teacher, while teaching, to evaluate how well the material is getting across to the student and thus to allow him to modify the content or the pace in accordance with the learning rate of the students.

There are commercially available very expensive wired communicators which provide each student with a plural push-button response station for multiple choice responses to a teacher question. These response stations are connected by suitable cabling to a console unit which scores the student answers and records the scores on counters. An even more sophisticated version provides meters showing the percentage of the group or audience making a particular response.

These known systems possess a number of important drawbacks. Among other things, they are very expensive and have not come into wide use in, for example, economy-minded school districts. In addition, the cabling connections are cumbersome and interfere with student and instructor movements. Further, the results have to be separately recorded by the teacher to provide a permanent record of the student's capabilities.

One object of our invention is to provide an improved responding apparatus that provides continuous interaction between a teacher or lecturer and a learning group.

Another object of the invention is an improved responding apparatus that provides a permanent record of the individual responses.

A further object of the invention is a responding system which provides positive indication of the correctness of the student's answers; that is, the right answer must be given to avoid the apparatus recording an incorrect response.

Still another object of the invention is a wireless responding system that is relatively simple and inexpensive, yet wholly reliable in providing a permanent record of the individual responses.

Still a further object of the invention is a wireless responding system that provides immediate reinforcement of the student's reply, by immediately indicating the correct answer as soon as the results have been recorded.

These and other objects and advantages of our invention are achieved by our novel responding system, which comprises, briefly, providing each of the students with a miniature signal generator and transmitter containing means, selectively actuable by the student, for modifying the transmitted information in at least two different ways. The teacher or instructor is provided with a receiver for receiving the different transmissions of the various students, preferably in succession, which receiver is provided with means for selectively detecting, controlled by the teacher, only certain of the transmitted information. The teacher's receiver is also provided with means for permanently recording the absence of the selected information in a manner enabling the teacher to identify the student source of the information.

In a preferred form of our invention, each student transmitter, when activated, generates a radio-frequency carrier wave at a different frequency from the other transmitters, and each radio transmitter is provided with means for modulating the carrier in at least several different ways, such as four different audio frequency signals or tones. The teacher's apparatus contains a radio receiver which can be tuned in sequence to receive each of the carrier waves in turn. Under control of the teacher, the receiver is also made responsive to selected ones of the different modulations, and the output from the receiver is utilized to actuate a printer only when the selected modulation is not present, indicating that the student has not selected the correct modulation and thus has the wrong answer. The printer is provided with a paper sheet or roll on which the students' names or other identifying symbols may be provided in separate rows, for example, and the printing mechanism is arranged to scan across the paper adjacent each student's name in a manner correlated or synchronized with the tuning sequence of the receiver for the different carriers. Hence, in succession, as the printer reaches the row on the paper associated with a particular student, simultaneously the receiver is automatically tuned to the carrier frequency of that particular student's transmitter. If the incorrect or no modulation was selected by that student, the printer will make a suitable mark on the paper in the row next to that student's name. When the scanning process is completed, automatically the instructor's apparatus indicates the correct response to the question. Thus, the students are immediately informed as to the correct answer, and the teacher simultaneously knows, in the form of a permanent record on paper, the number or percentage of students that know the correct answer to the problem posed, as well as the names of the individual students who have not fully absorbed the lesson given.

Several forms of our invention will now be described in greater detail with reference to the accompanying drawing, in which:

FIGS. 2 and 3 are block and schematic circuit diagrams, respectively, of each of the student or answering transmitters;

FIGS. 4 and 5 are block and schematic circuit diagrams, respectively, of the receiver and printer circuitry;

FIGS. 10 and 11 show a modification.

Figure 1:
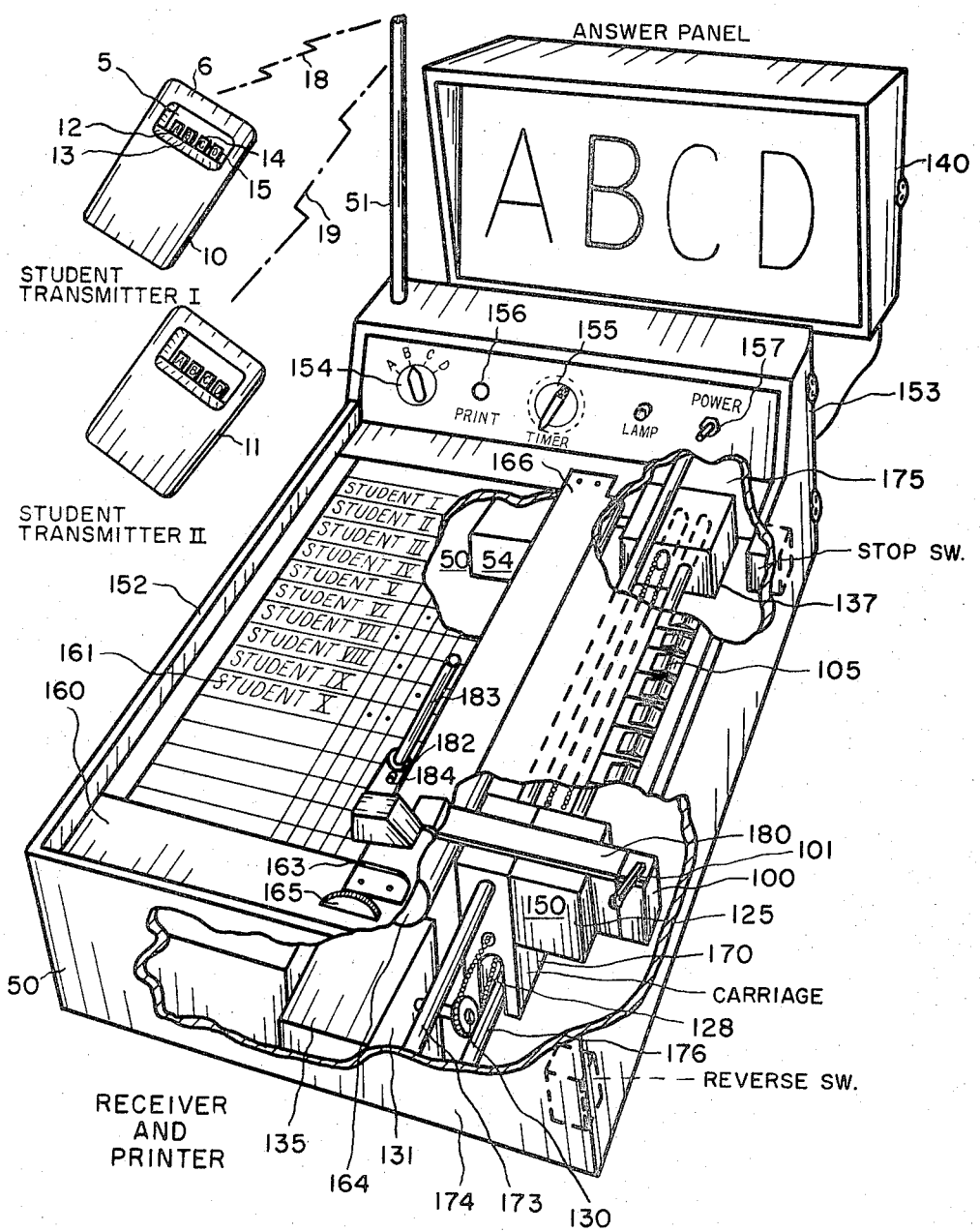
FIG. 1 is a perspective view showing one form of answering system in accordance with the invention, only two of the plural transmitters being shown.

Referring now to the drawing, FIG. 1 shows, schematically, the whole system. Each of the students or audience members possesses a transmitter 10, 11 which, in the embodiment shown, is of the wireless type. Each transmitter generates a carrier wave 18, 19 at a different frequency, and each transmitter contains means for modulating the carrier in four different ways. In the preferred embodiment, different audio signals or tones are used as the different modulation, the particular modulation appearing on the carrier being determined by the student activating his selector switch, which in the preferred embodiment is one of four pushbuttons 12, 13, 14, 15. An internal loop antenna 24 radiates the selected-tone-modulated carrier throughout the classroom. In the preferred embodiment, the modulations are the same in each transmitter. Thus, every student that depresses pushbutton B, for example, generates an 800 cycles per second modulated carrier wave at a different frequency.

The teacher is provided with a tuned receiver 50 which automatically tunes in each of the different carrier waves in succession. Thus, in succession will appear at the output of the receiver the detected modulation or tone corresponding to the student's depressed pushbutton. A variable filter or tone selector is provided for selection by the teacher corresponding to the correct answer or correct tone, and, if present, the signal passes through the filter and energizes a relay. The relay contacts are normally closed so that energization opens the contact circuit, which includes a solenoid for activating a pen or like marking device. Thus, the presence of the correct tone or signal disables the printer mechanism, and no mark appears opposite the student's name: In other words, the correct answer must be present in a positive manner to avoid an incorrect mark. The printer also includes a solenoid conditioning switch which ensures that the pen makes the notation in the correct row. The paper is moved column by column for each new question asked. When the printing cycle is completed after each question, a section of the answer panel 140 lights up indicating the correct answer to reinforce the student's knowledge.

More detailed illustrations of the parts of the system are presented in the remaining figures, the same reference numerals being employed to designate the same elements. FIG. 2 is a block diagram of the student transmitter 10. It comprises a crystal-controlled radio-frequency (R.F.) oscillator 20. For such local wireless applications, the FCC has provided space in the radio spectrum in the 88–108 megacycles per second (mc.p.s.) range. For the case of thirty transmitter units, we prefer the range of 88–93 mc.p.s., with the carriers or channels spaced apart by 0.1 mc.p.s. or more. The radiated power required for the average classroom is about 75 microvolts per meter. Transistorized R.F. oscillators in this range and of satisfactory stability are readily manufactured. FIG. 3 illustrates one satisfactory arrangement. It comprises an npn high-frequency silicon transistor 21 whose base connection is connected to a piezoelectric crystal 22 which controls the operating frequency. The circuit shown uses internal feedback through the transistor itself. The output circuit connected to the collector includes a loop antenna 24, which is mounted within the transmitter housing, and a capacitor 25 resonant or tuned to a fifth harmonic of the fundamental mode of the crystal 22, and this is the frequency of the carrier radiated. The crystal provides basic frequency stability. Amplitude stability is afforded by the self-biasing arrangement of parallel resistor 26 and capacitor 27 connected to the emitter. A battery 28 supplies the power through a coupling resistor 29 and an isolation choke 30 to the collector, and through a voltage divider 31, 32 to the base circuit. Capacitor 33 is an R.F. decoupling capacitor.

Referring back now to the block diagram of FIG. 2, the R.F. oscillator 20 is modulated by a signal or tone supplied by a tone generator 35 whose output can be varied as selected by each student through a selector switch 45. The tone generator, as shown in FIG. 3, comprises a pnp audio germanium transistor 34 oscillator using external feedback from the emitter to base circuits via a frequency selective circuit including a transformer 36. In the form shown, the frequency determining elements include four rheostats 37 (only one of which is shown), each in series with a capacitor 38 (only one of which is shown), serving as trimmers, both in parallel with each of four capacitors 39, 40, 41, 42 across the transformer secondary. Power is supplied via resistors 43, 44. The student selector switch 45 includes four pushbutton 2-wafer switches, labelled A, B, C and D. Depressing a pushbutton not only connects through one wafer 46 a particular capacitor as a tone-determining element into the tone ocillator 35, but also through the second wafer a set of contacts 47 applies the battery potential to both the R.F. oscillator and the tone generator. Thus, battery life is prolonged. The points marked with + sign are of course connected together. The output tone signal developed across a collector load resistor 48 is coupled into the collector circuit of the R.F. oscillator, and the latter is thus collector modulated.

As will be noted from FIG. 1, the pushbuttons A, B, C, D extend within a deep-seated recess 5 within the housing 6 of the circuitry and below the surface thereof. The pushbuttons move up and down in the longitudinal direction of the housing. Thus, in normal use, the fingers and hand of the student covers the buttons and recess opening and hides the buttons from view, enabling a private response to be made and making it more difficult for neighboring students to see which button is depressed.

FIG. 4 is a block diagram of the receiver and printer. The receiver is a typical superheterodyne receiver with tuned R.F. amplifier stage 52 and several intermediate frequency (I.F.) amplifier stages 53, 53a to increase the selectivity. The signals picked up by a whip-antenna 51 mounted on the receiver housing is coupled into the input of the R.F. amplifier 52. The receiver is tunable by a conventional 3-ganged variable capacitor 54 with one section controlling the antenna coupling frequency, the second section controlling the R.F. stage, and the third section controlling the oscillator section 55. The three sections, on a common shaft, are coupled to a motor 135 through suitable gearing such that rotation of the motor varies the capacitor and tunes the receiver to different frequencies or channels. The I.F. signal (10.7 m.c.p.s.) derived from the mixer 56 is passed through an I.F. stage 53, converted down 53b to .455 m.c.p.s. and amplified in another I.F. strip 53a to narrow the bandwidth and increase the selectivity, the tone modulation detected in a conventional detector 57, amplified, and passed through a filter or tone discriminator 60, shown in more detail in FIG. 5. Up to the latter, a conventional transistorized receiver is involved and thus more details thereof are considered superfluous.

Figures 5, 11:
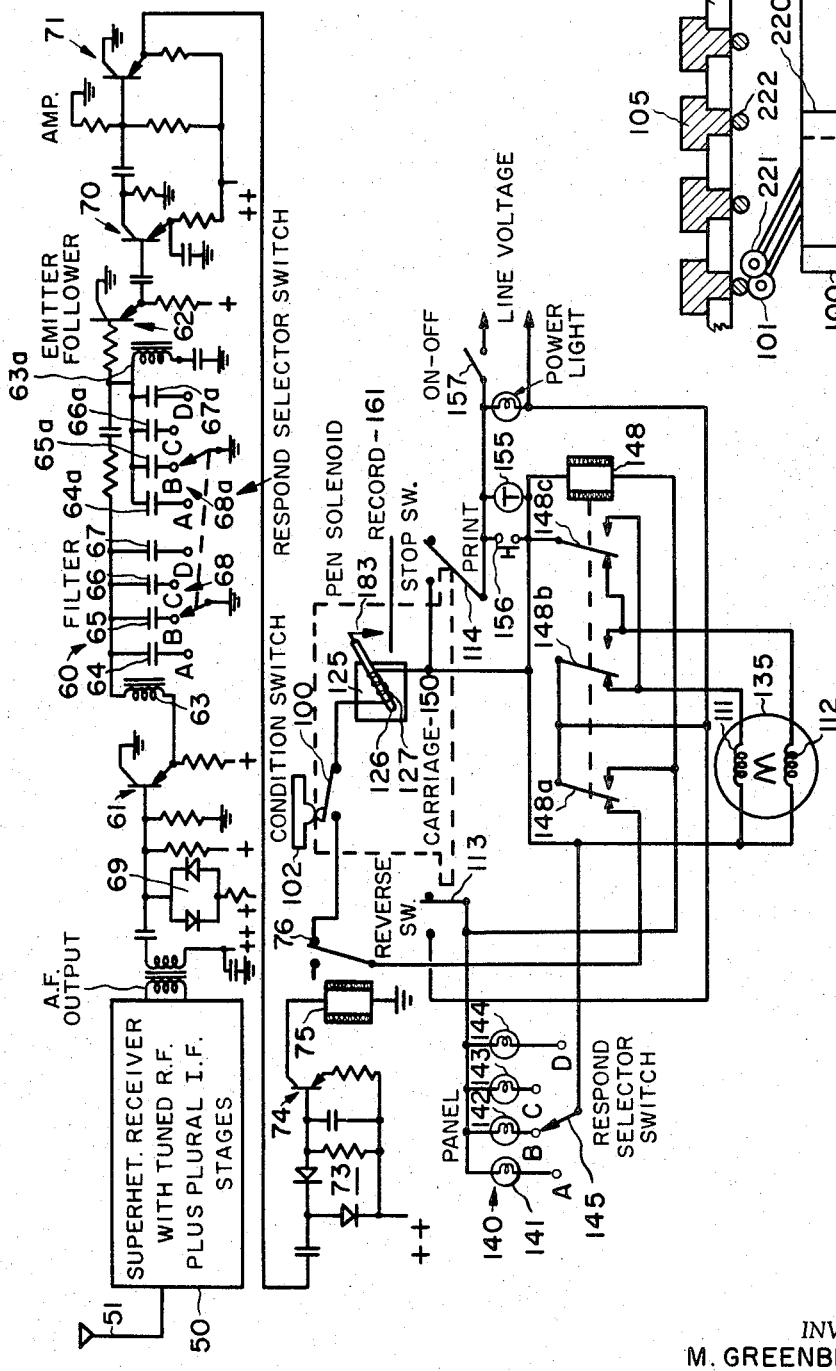

The tone discriminator or filter 60 is designed to pass only the correct or selected tone signal and to intercept all others. As shown in FIG. 5, it is preceded and followed by emitter follower stages 61 and 62 to increase its isolation from the remainder of the receiver. The filter itself includes a resonant circuit constituted by two inductors 63, 63a and one of four parallel capacitors 64, 64a, 65, 65a, 66, 66a and 67, 67a for each inductor selected by the contacts on wafers 68, 68a of a respond selector switch. A parallel diode circuit 69 is provided to improve the shape or squareness of the passed signal. Generally the tones vary from about 400 to 1200 c.p.s., with separations of 200 to 300 c.p.s. and thus the desired tone is readily separated from the remainder, care of course being taken in the choice of tones to assure that no harmonics or sum or difference frequencies of the various tones could inadvertently produce a tone that would pass the filter 60. The points marked X are connected together, the points marked ++ are connected to the full B+ potential, and the points marked + are connected to approximately ½ the B+ potential.

If the wrong push-button was depressed, no signal will appear at the output of the filter. If the correct tone is present, a signal will appear which is subsequently amplified in two audio amplifier stages 70, 71, the signal voltage at the output of the latter doubled in a voltage doubler circuit 73 to drive a power output stage 74, in the collector circuit of which is the coil of a relay 75. The contacts 76 of the relay 75 are normally closed. They are in a circuit which includes a condition microswitch 100, a solenoid 125 and the line voltage.

The parts inside the dotted polygon are part of the pen carriage 150 of the printer 151. It is housed in a portable suitcase-type enclosure 152 which houses on the inside most of the electronics illustrated in FIGS. 4 and 5. An upright panel 153 in the rear affords provision for the operating controls, which include the respond selector switch knob 154, the timer 155, the print switch 156, and the usual power ON-OFF switch 157. The enclosure 152 is provided with a top cover plate 160 which on the left side supports the paper record sheet 161. As shown in FIG. 1, the paper record 161 is inserted manually into a curved opening 163 over a roller 164 provided with a thumbwheel 165 at its lower end. An arcuate elongated shield member 166 helps define the opening 163 and protect the paper. When the thumbwheel 165 is moved to the left, the paper sheet 161 feeds out over the cover exposing a new column for each new question asked. The roller 164 may be provided with a ratchet and detent or similar stepping device providing a movement of the paper of the width of one column. As will be further evident, the paper movement can be readily automated using a stepping motor, solenoid, or the ratchet, to automatically move the sheet one column immediately after the results of the preceding question have been printed out on it.

Figure 6:
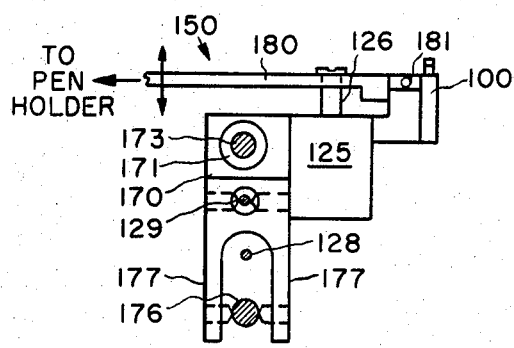
FIG. 6 is an elevational detail view of parts of the preholding carriage of the printer.
Figure 7:
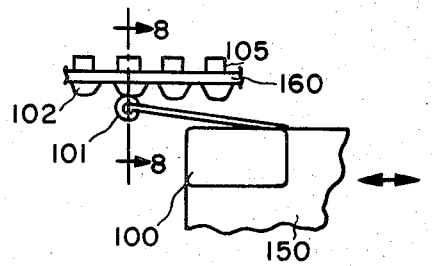
FIG. 7 is a side detail view of the conditioning switch.

The marking device comprises a carriage mechanism 150 which, in the embodiment shown, scans down the paper in a position to make a notation opposite the name of any student who fails to depress the correct pushbutton. The carriage 150 includes, as shown in FIG. 1 and the elevational view in FIG. 6, a member 170 mounted by means of roller bearings 171 on a main shaft 173 whose ends are fixed at the front 174 and rear 175 walls of the enclosure 152. A second parallel shaft 176 extends alongside the main shaft 173. While shown vertically underneath, the shaft 176 can be arranged horizontally also. Extensions 177 from the member 170 ride on opposite sides of the second shaft 176 and prevent twisting of the member 170. The latter carries an arm 180 pivotable 181 at the edge of the member 170. The outer end of the arm 180 carries a cylinder 182 for receiving a marking pen 183. A thumbscrew 184 is provided on the cylinder 182 for locking the pen 183 into position. The arm 180 carrying the pen 183 is actuated by the plunger 126 of the solenoid 125. As is usual, the solenoid 125 includes a coil 127 (see FIG. 5) surrounding a spring-biased plunger 126. When the coil 127 is energized, the plunger 126 is pulled inward, pivoting the arm 180 downward and causing the pen 183 to make a mark on the sheet 161 opposite where the carriage 150 is then located.

The carriage 150 is driven up and down the record sheet by chain 128 which is anchored to the member 170 at 129. A sprocket 130 journalled near the front wall 174 drives the chain 128; the sprocket 130 is in turn coupled through suitable gearing 131 to the motor 135. A sprocket (not shown) at the opposite end, driven by the chain 128, connects through suitable gearing 137 to the shaft of the variable tuning capacitor 54 of the receiver 50. Hence, as the carriage 150 scans the paper, the receiver 50 is simultaneously and automatically tuned. The gearing ratios are chosen so that as the carriage-driven pen 183 arrives opposite each row on the paper 161 corresponding to a particular student, the receiver simultaneously is tuned to that receiving channel of the carrier frequency transmitted by that student. Thus, the carriage motion is synchronized with the receiver tuner so that each student's answer can be detected and compared with the correct answer, determined by the position of the respond selector switch 68, only while the moving pen 183 is opposite the row on the record sheet 161 reserved for that particular student. This result is readily achieved by separating the student channels by substantially equal intervals and employing linear tuning for the receiver, which is easily obtained comercially. Thus, as the pen moves in linear fashion over the paper, the student channels are brought in in a linear sequence synchronized with the pen movements. While a chain drive is described for the carriage, it will be appreciated that other drive means are possible, for example, threading the main shaft 173, providing a threaded bushing on the carriage 170, and rotating the threaded shaft to drive the carriage back and forth. Also, the solenoid 125 can be separated from the carriage 150 and suitably linked to the pen holder 182 to degress or tilt it when the solenoid circuit is closed.

Since the transmitted frequencies may drift slightly, as may the frequency of the local oscillator of the receiver, the marks made by the pen may intercept the lines between the rows causing possible ambiguity. To avoid this possibility, and to secure other advantages to be described, we employ a condition switch 100 to isolate a short time interval during which the pen can be activated in the center of the time interval it takes for the pen to cross a row of the record sheet 161. In a preferred form, we provide a microswitch 100 with roller follower 101 mounted on the member 170 of the carriage 150. On the underside of the printer cover plate 160 is provided a column of slidable cam lobes 102. One cam lobe 102 is provided for each row on the record sheet 161. As the carriage scans over the sheet, the roller follower 101 of the microswitch 100 is carried along therewith, riding over the cam lobes 102 and thus closing the microswitch 100 for a short time interval as the pen passes over each row on the record sheet. As is evident from FIG. 5, the microswitch 100 contacts are in series with the pen-activating solenoid 125. Thus, the pen cannot be activated unless the microswitch 100 is actuated, or, to put it another way, the actuation of the microswitch 100 conditions the solenoid 125 for activation. While the signal relay 75 remains deenergized, which means that the correct modulation is not present, closing of the condition switch 100 will cause activation of the solenoid 125 and produce a mar on the record sheet 161 on a particular row. When the signal modulation is present, the signal relay 75 is energized, disabling the solenoid circuit and preventing a mark from being made on the record sheet 161.

Figure 8:
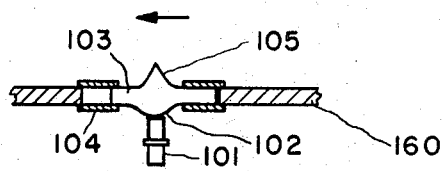
FIG. 8 is a cross-sectional view along the line 8—2 of FIG. 7, showing the sliding cam lobe.

As shown in FIGS. 1 and 8, provision is also made for sliding sideways each of the cam lobes 102 out of the path of the roller follower 101 and thus preventing the microswitch 100 from closing and the pen 183 from making a mark on the record sheet 161. As shown, each cam lobe 102 depends from a slide 103 mounted within a frame 104 on the cover plate 160 which allows a small sideways displacement of the cam lobe 102. A small projection 105 is available at the top side of the cover plate 160 for selectively manually shifting the slide 103 from operative to inoperative position and back. The teacher can use the aparatus of our invention to take attendance by having all the students press, for example, the A pushbutton, setting the respond selector switch 154 at position A, and pressing the print switch 156, which will then result in a mark being placed in the first column opposite the name of any absent student. Then, the teacher shifts the slide 103 in that row to the left to the inoperative position. This prevents marks from being continuously placed in the row of the absent student due to the absence of the correct modulation.

The motor 135 is a reversing motor, illustrated by two field coils 111 and 112. Various switches and circuitry, illustrated in FIG. 5, are employed to control the motor 135 and other components of the system. For example, pressing of the print switch 156 momentarily closes the circuit to the motor winding 111 through contact 148b of relay 148, starting the motor and driving the carriage forward in the printing cycle. Movement of the carriage releases stop switch 114 which shorts out the print switch 156. Contact 148c shorts out the reversing winding 112 of the motor. When the carriage 150 reaches the end of its forward movement, a reverse microswitch 113 is momentarily actuated which closes the relay 148 circuit, energizing it and shifting its contacts, set 148c now shorting out the forward winding 111, and contact set 148b now supplying power to the reversing winding 112, which starts the carriage back toward its starting point returning the reverse switch to its original position. However, contacts 148a keep the relay 148 energized. The same contact 148a in its initial position was in series in the pen solenoid circuit. Thus, energization of relay 148 and shifting of the contact arm 148a opens the solenoid circuit and prevents the pen from being activated during the carriage return movement. When the carriage 150 reaches its starting position, stop microswitch 114 is actuated and its contacts opened terminating power into the sysytem, which stops the motor 135 and deenergizes the relay 148, which shifts the contacts 148a closing them in the solenoid circuit and thus preparing it for another print cycle. Other suitable circuitry to achieve the foregoing performance will be evident to those skilled in this art.

One additional important function served by the reverse switch 113 when actuated by the carriage 150 at the end of its forward movement after the recording process is complete, is to turn on the section of an answer panel 140 corresponding to the correct answer. The answer panel 140, illustrated in FIG. 1, is a vertically standing panel which faces the class or audience and can selectively display a letter or other symbol designating the correct answer. In a preferred form, as shown in FIG. 5, we provide small lamps 141, 142, 143, 144 each behind one of the letters A, B, C and D on the front translucent section of the panel. The respond selector switch includes another wafer or set of contacts 145 ganged to the first set 68. The contacts 145 select which particular lamp, 142 for example, will be lit when the reverse switch 113 is activated. Thus, as soon as the recording process is complete, the answer panel lights up with the correct answer established by the teacher. The lamp circuit remains closed by contact 148a until the carriage returns to its starting position.

The timer switch 155 is a standard component which starts the recording cycle a specified time interval after the question has been asked. For example, after the question has been posed, the timer is set for 10 seconds, and when that period expires, the printing cycle is automatically initiated.

As is clear from the foregoing, the apparatus is designed to mark in the absence of the correct tone. The conditioning switch 100 is provided to ensure that the printer will not mark except while the appropriate carrier is tuned in. Thus, if the carrier will be received and detected while the carriage traverses, say, the center half of the row width, then the condition switch is arranged to close only for a short time interval within that larger time period during which the center half of the row is traversed, to ensure that, while the condition switch contacts are closed and thus the printer is ready to print, the tuner is receiving the carrier. (It will be appreciated that the absence of the carrier will produce the same effect as the absence of the correct tone.) This result is ensured by suitable adjustment of the tuning characteristic of the receiver and the gearing connecting the motor to the carriage and to the tuner. Shortening the time interval during which the conditioning switch is closed simplifies the obtention of this result. FIGS. 10 and 11 illustrate a modification which provides a very short time closing of the conditioning switch. In this modification, a second similar microswide 220 is mounted alongside the original microswitch 100, but slightly displaced in front or behind the latter, as shown. The contacts of the second microswitch 220 are in series with that of the first microswitch 100 as shown in FIG. 10. Both followers 101 and 221 are activated by the same cam lobe, which may be a small rod 222 mounted on the bottom of the slide 105. Thus, the more forward microswitch 100 will have its contacts close and open just before the time that the contacts of the second microswitch 220 close and open. The time during which both contact sets are closed, i.e., where the closed periods overlap, is the time interval during which the solenoid circuit is conditioned to print. By adjustment of the spacing of the two microswitches 100, 220 that closing time can be made as short as desired to ensure that the appropriate carrier is tuned in. To reduce wear, we prefer that the follower rollers are hinged (not shown) to avoid contact with the cam lobes on the return stroke of the carriage, which is commercially available. While a mechanical actuation of the conditioning switch has been shown, magnetic actuation is of course also possible. That is, substituting for the microswitch a magnetic reed switch, and substituting for the cam lobes a series or line of small magnets. As the reed switch rides under each magnet and is exposed to its field, the contacts close in accordance with principles well known in the art. The magnets are adjusted in position so that the reed switch closes only while the appropriate carrier is received.

As will be evident from the foregoing, our invention offers the following advantages over the prior art systems. The system cost is much lower, allowing for a wider use of this excellent teaching adjunct. A permanent record on paper of the student responses is immediately available affording automatic attendance and grading records. In the preferred, wireless embodiment, connecting cables between the students' transmitters and the teacher's receiver are unnecessary, avoiding cluttering up of the room and impeding movement of the student and teacher. A flexible system is provided which is capable of use in any kind or shape of classroom, laboratory or lecture hall in view of the wireless techniques employed. Its portability enables different teachers to share the use of the equipment in their own classrooms. The quick response time of the system and the short instant during which each of the student's responses are received and detected guards against student manipulation of his selector switch in the hope of generating nearly simultaneously all of the possible modulations.

Our invention has been described in connection with a wireless embodiment, which is the preferred form for the reasons indicated above. However, where the advantages of the wireless system are not desired, it is also within the principles of our invention to employ a wired system. In such a case, the student transmitter need only contain the different tone generators, one for each answering position, and the resultant tone can be transmitted through wire conductors directly to the teacher's receiver. The receiver in turn is modified to substitute for the tuned superheterodyne receiver a simple stepping switch or like mechanism connected to each of the student lines. The motor which drives the pen carriage is also coupled to the wiper arm of the stepping switch to simultaneously scan; as will be evident from the foregoing principles of our invention, the stepping switch and thus receive in sequence the signals transmitted by each student at the time the pen carriage arrives opposite the row on the record sheet corresponding to that particular student. The received signals are passed through the selective filter system in the same manner as the detected audio signal is treated in the wireless version, and the system from the filter stage onward remains the same. Thus, if the correct signal is present, the relay is activated, disabling the pen solenoid circuit and preventing a notation from being made on the record sheet.

It will also be appreciated that, in the wireless version, it is not essential that each student transmit at a different carrier frequency. It is also possible, for example, that several of the transmitters oscillate at the same carrier frequency, but then the tones generated by one transmitter will all have to be different from the tones generated at the other transmitter with the same carrier frequency. This modification would also require a filter capable of passing two tones, which would both correspond to the correct answer. Also, the tuning characteristic of the receiver would have to be modified to receive the same carrier over a period twice that described in the other embodiment. Since such a characteristic would be more difficult to realize in practice, compared with the linear characteristic needed with the embodiment described in detail, we prefer the latter arrangement.

Along the same lines, another variation of our wireless system may employ ultrasonic signals. In this case, each student is provided with an ultrasonic generator capable of generating plural ultrasonic signals, such as four tuning fork generators at different frequencies. Activation of one of the tuning forks generates an ultrasonic signal throughout the classroom. The teacher receiver, for this modification, will require means for selectively detecting one of the four frequencies corresponding to the correct answer. Because of the lack of a carrier, each of the students will generate four different signals; thus, there will be $n$ correct signals corresponding to $n$ students. Satisfactory operation then requires, as the carriage scans down the record sheet, that the frequency selective filter circuit is simultaneously modified to receive the correct signal among the four possible signals associated with that particular student. As an alternative, the teacher's respond selector switch, when switched, for example, to position B, automatically, through ganged switching, switches into the filter $n$ circuits adapted to detect the $n$ correct signals. Though this wireless modification may be more complicated and thus we prefer the arrangement described and illustrated in detail, it is to be understood that all such modifications are within our contemplation.

It will be further understood that, while we presently prefer the conditioning and synchronizing technique described in connection with the embodiment illustrated, other means of achieving such synchronization are considered within the principles of our invention. For example, instead of the cams operating a microswitch, contacts can be mounted or printed on the underside of the printer cover to act as a sort of commutator for conditioning the pen solenoid for activation as the carriage rides over it. It is also possible to eliminate the condition switch in its entirety by replacing the continuously driven carriage with a stepping mechanism which would allow it to step down the paper record, row by row, while the receiver is similarly tuned, with a suitable mechanism present to prevent the pen from marking between rows, though undoubtedly such an arrangement would be more costly and possibly slower than the preferred embodiment. It will also be recognized that present manual operations can be readily automated by techniques well known in the art. For instance, if visual aids are employed to project automatically the questions onto a screen, suitable automatic equipment can be readily adapted to automatically set the respond selector switch in the receiver to the correct answer as each new question is projected, and also automatically set the timer to the time interval permitted to answer the question. Also, the system can be arranged so that the questions asked or program used depends upon the percentage of students giving correct answers. Thus, the entire question and answer system is readily automated using the equipment of our invention.

Figure 9:
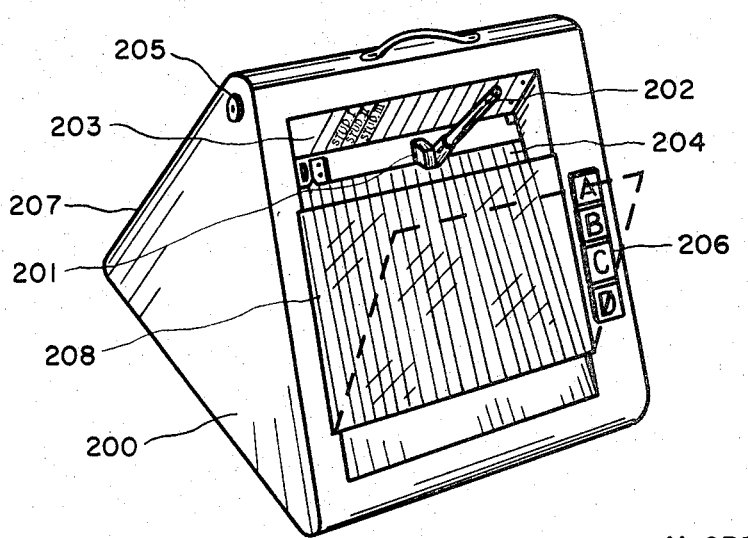
FIG. 9 is a perspective view of another form of answering system in accordance with the invention.

The form that the apparatus takes is also capable of wide modification. FIG. 9 illustrates a variation in which the printer and answer panel have been combined with a speaker's lectern into a single unit 200. As will be evident, to achieve this arrangement, the printer illustrated in FIG. 1 has been rotated 90° counterclockwise so that the carriage 201 carrying the pen 202 now scans from left to right instead of from top to bottom, the interior construction being otherwise the same. The students names, for convenience, are now placed on plates 203 extending over the record sheet 204, which may be derived from a paper roll actuated by a knob 205. A respond selector switch 206 in the form of pushbuttons is located along the right edge of the assembly. The answer panel, not shown, is conveniently located within the assembly 200 at its rear side 207 so that the letters face and are visible to the audience. A transparent support panel 208 is located over the record sheet 204. This can be used to hold papers and notes of the speaker. Thus, the assembly is useful as a lectern.

Other modifications will readily occur to those skilled in the art, and it is to be understood that we do not therefore desire to be limited to the specific arrangements shown and desscribed, but intend in the appended claims to cover all modifications within the spirit and scope of our invention.

What is claimed is:

1. An answering system comprising a plurality of radio transmitters each adapted to transmit a carrier at a different frequency, each of said transmitters containing means for selectively modulating said carrier in one of plural ways, the plural modulations being the same for each of the transmitters, a radio receiver, means for tuning the radio receiver to receive in sequence the carriers from all the transmitters, means in the receiver for detecting the modulations on the carrier, selective means for passing only a selected modulation and intercepting the other modulations, means responsive to the absence of a passed modulation to provide a permanent record on a record sheet, said record sheet having spaces associated with each of the radio transmitters, and means for causing the recording means to scan across the sheet in synchronism with the receiver tuning means such that the recording means is always positioned at the space associated with each of the transmitters at the time it is tuned to receive the carrier from said transmitter.

2. An answering system as set forth in claim 1 wherein the recording means comprises a carriage with a signal-activated marking device, means for driving the carriage across the record sheet, and means coupling the carriage-driving means to the receiver tuning means.

3. An answering system as set forth in claim 2, and comprising a printer conditioned to print an a record each time that a different carrier frequency is received, said means activated by the signal corresponding to a passed modulation disabling the printer and preventing same from making a record.

4. An answering system as set forth in claim 2, and including means for displaying a symbol indicative of the selected modulation after the carriage has completed crossing the record sheet.

5. An answering system as set forth in claim 4 wherein the displaying means includes plural symbols equal in number to the number of possible modulations, and means are provided coupled to the receiver selective means for illuminating the symbol of the plural symbols corresponding to the selected modulation.

References Cited

UNITED STATES PATENTS

| | | | |
|---|---|---|---|
| 1,633,100 | 6/1927 | Heising | 340—171 |
| 2,282,102 | 5/1942 | Tunick | 340—171 |
| 2,397,562 | 4/1946 | Potter | 346—37 |
| 2,418,750 | 4/1947 | Bliss | 346—37 |
| 2,465,976 | 3/1949 | Goldsmith | 340—171 |
| 2,552,585 | 5/1951 | Rahmel | 346—37 |
| 2,630,525 | 3/1953 | Tomberlin | 340—171 |
| 2,660,508 | 11/1953 | Rahmel | 346—37 |
| 3,186,109 | 6/1965 | Brinton | 35—9 |
| 3,300,876 | 1/1967 | Johannsen | 35—9 |
| 2,630,367 | 3/1953 | Rahmel | 325—311 |

EUGENE R. CAPOZIO, *Primary Examiner.*

W. W. NIELSEN, *Assistant Examiner.*

U.S. Cl. X.R.

346—37